J. J. CHAPIN.
MOTOR CYCLE.
APPLICATION FILED APR. 19, 1913.
1,167,625.
Patented Jan. 11, 1916.
2 SHEETS—SHEET 1.
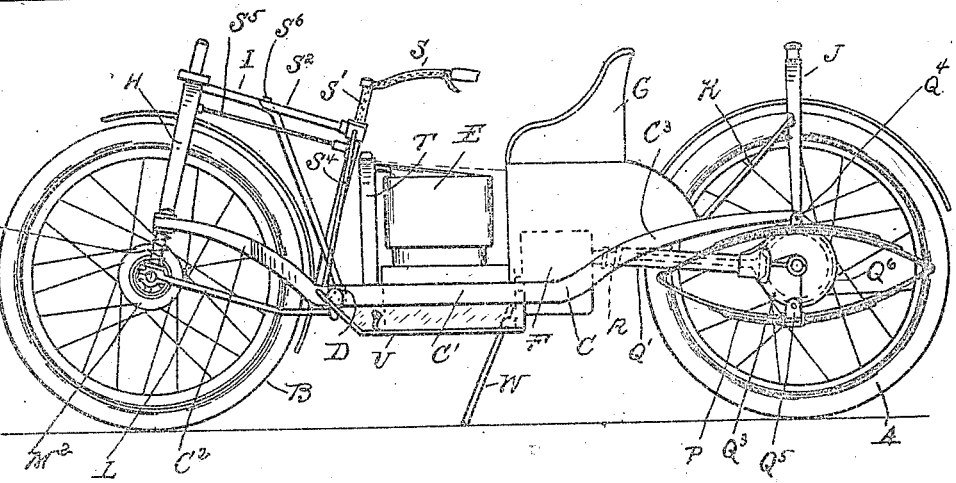
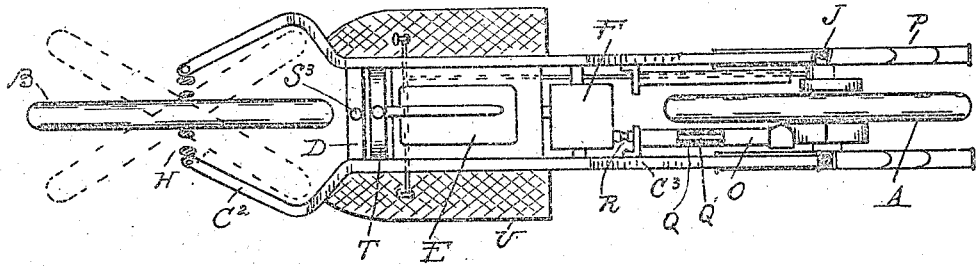

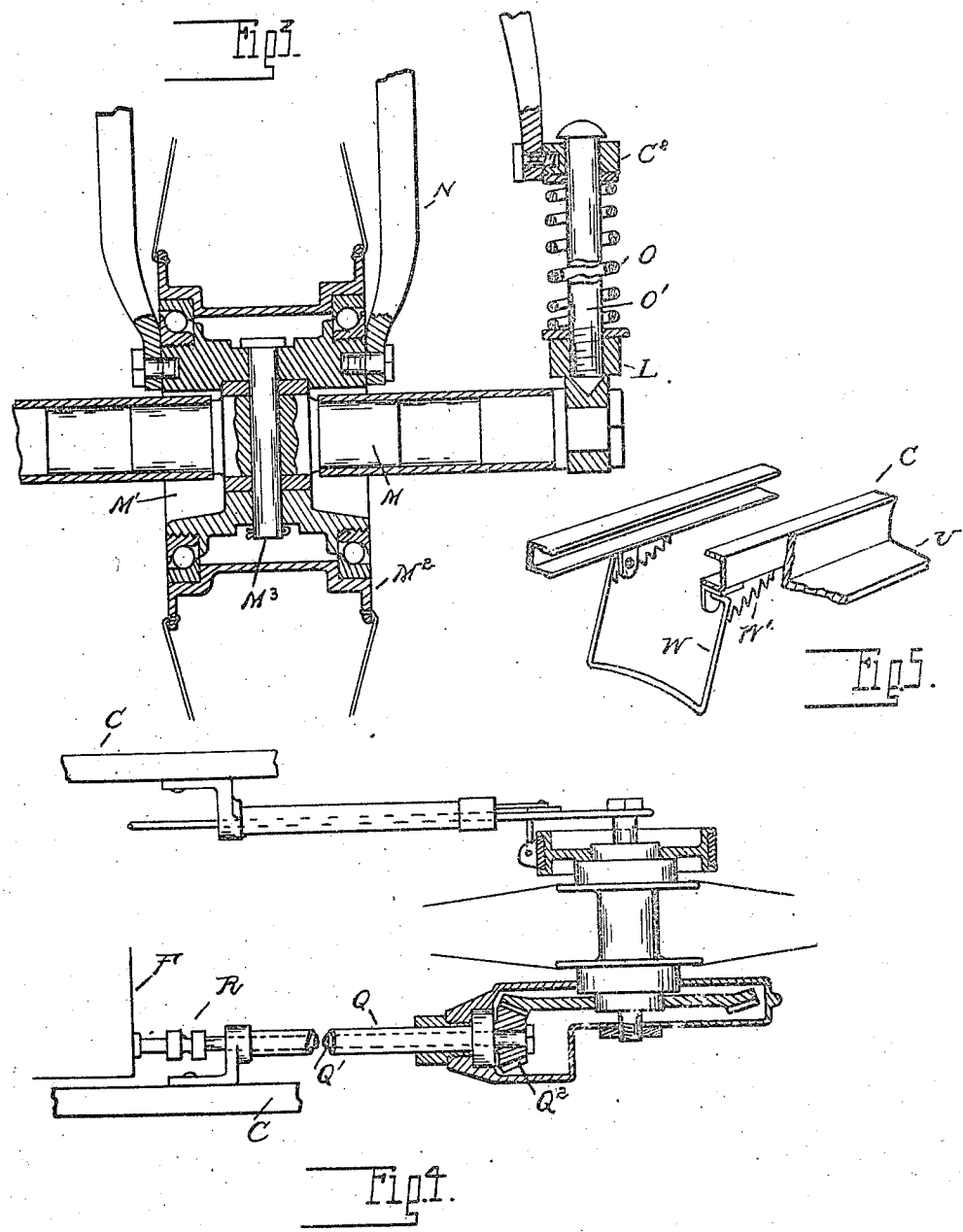

UNITED STATES PATENT OFFICE.

JOHN J. CHAPIN, OF DETROIT, MICHIGAN, ASSIGNOR TO STEPHEN A. GRIGGS, OF WALKERVILLE, CANADA.

MOTOR-CYCLE.

1,167,625.  Specification of Letters Patent.  Patented Jan. 11, 1916.

Application filed April 19, 1915. Serial No. 762,164.

*To all whom it may concern:*

Be it known that I, JOHN J. CHAPIN, a citizen of the United States of America, residing at Detroit, in the county of Wayne and State of Michigan, have invented certain new and useful Improvements in Motor-Cycles, of which the following is a specification, reference being had therein to the accompanying drawings.

The invention relates to motorcycles, and has more particular reference to the construction of the frame and the means for resiliently supporting the same upon the driving and steering wheels.

The invention further relates to various features of construction as more fully hereinafter set forth and claimed.

In the drawings: Figure 1 is a side elevation of the machine; Fig. 2 is a plan view thereof; Fig. 3 is a cross section in the plane of one of the axles; Fig. 4 is a horizontal section; and Fig. 5 is a perspective view.

A is the driving wheel and B the steering wheel arranged in the usual tandem relation. C is a frame resiliently supported upon said wheels through the medium of suitable springs, but held in such relation as to neither interfere with the driving or steering mechanism. Specifically, the frame C preferably comprises a pair of substantially parallel side sills C′, having a central horizontal portion connected by cross sills D, and upon which is mounted the engine E, transmission gearing F, seat G, as well as other parts of the mechanism. At opposite ends of this central portion of the frame are upwardly-bent end portions $C^2$ and $C^3$, which respectively embrace the forward and rear wheels.

The forward portions $C^2$ of the frame, as shown in plan view, are laterally deflected to provide clearance for the turning of the steering wheel and beyond the point of deflection converge. At their ends they are connected to a yoke frame H which passes over the wheel, providing sufficient clearance for vertical oscillation thereof. The upper end of the yoke frame is braced by a rod I which extends rearward and downward in an inclined direction to the cross bar D, to which latter it is attached, preferably by a threaded shank passing through an aperture in the cross bar. At the rear end of the frame C is a similar yoke J, passing over the rear wheel and braced by a pair of rods K extending to the opposite side sills.

To permit of vertical oscillation of the wheels and at the same time to hold them in the central plane of the frame, each wheel is mounted in a fork, which at its lower end is connected to the frame by radius rods, and at its upper end has a slidable bearing in the yoke. The radius rods L for the forward or steering wheel are connected to a stationary axle M, with passes through a hollow journal bearing M′ for the hollow hub $M^2$, and is pivoted to the former by a vertical pin $M^3$. The fork N for this forward wheel is secured to opposite ends of the bearing M′, and by reason of the clearance provided by said hollow bearing, the fork and wheel are permitted to turn for steering. As has been stated, the frame members $C^2$ are laterally deflected to provide clearance for the wheel and the radius rods L are similarly bent. Thus the wheel, while free to be turned by the steering mechanism, is nevertheless strongly connected to the frame, and also is free to oscillate vertically.

The frame is resiliently supported on both of the wheels. This is accomplished by springs O for the forward wheel, which are sleeved upon vertical studs O′ connected to the radius rods L, and which pass through slotted bearings in the ends of the frame member $C^2$. The rear wheel is supported upon springs P, preferably of full elliptic form, the upper member being attached to the portion $C^3$ of the frame. The lower members of these springs are attached to radius rods Q, one of which forms a housing for the drive shaft Q′ and the bevel gearing $Q^2$ for driving the rear wheel. The shaft Q′, after passing out through the end of the radius rod, is coupled by a universal coupling R with a shaft extending into the housing for the transmission gearing, and this coupling R is in transverse alinement with the pivotal point of the radius rod Q, so that the oscillation of the wheel will not interfere with the driving thereof.

For steering the forward wheel, a handle-bar S is suitably mounted on the frame and connected to the fork N. I preferably arrange the steering stem S' in rear of the forward wheel and mount it in a detachable frame S², which is secured to the brace rod I. The lower end of the stem S' is stepped in a bearing S³, from which it may be vertically disengaged when the frame S² is detached.

S⁴ are laterally and downwardly inclined brace rods for connecting the frame S² with the side sills C and holding the steering stem in position.

S⁵ is a rod or other operating connection between the steering stem and the fork N for transmitting an angular movement of one to the other. Thus by detaching the frame S², which is secured by a bolt S⁶, and by also detaching the lower ends of the brace rods S⁴ and the rod S⁵, the steering stem and handle-bar may be removed.

The engine employed on my motorcycle is preferably of a water-cooled type, which requires a radiator for dissipating the heat. To avoid injury to this radiator, it is so designed and arranged in relation to the frame as to be protected even where the machine is lying upon its side. As shown, the radiator T is placed in front of the engine and just in rear of the steering stem, being mounted upon the horizontal portion of the frame. In this position, the laterally-deflected portions C² of the frame, together with the yoke portions H and J, form a shield or guard projecting outward beyond the boundaries of the radiator.

U are foot boards secured upon opposite sides of the frame, their forward ends preferably extending to the laterally deflected portions C².

W is a stand for holding the machine in upright position, and which is in the form of a bail pivoted to the side sills C, and provided with a spring W' for normally holding it retracted. When this bail is depressed and turned beyond the vertical, it will form a stable support for the wheel. In starting, it is not necessary to disengage the stand first, for the reason that the frame is resiliently supported upon the wheels, and consequently the lifting movement of the stand in passing over the center will not raise the drive wheel off the ground. Another feature in the construction of the stand is that it is positioned near the center of gravity, and therefore if either the front or rear wheel is removed, the stand will stably support the remaining portion of the machine.

In repairing the machine, it is frequently desirable to remove the driving wheel. My construction provides for this without the necessity of dismounting the frame, and to this end the housing for the gearing Q² is formed in separable sections. One section Q³ is integral with the tubular radius rod Q, and this section also is provided with a lug Q⁴ to which the yoke J is attached, and the bearing Q⁵ for attachment with the spring P. The complementary portion of the housing is formed by a section Q⁶ which is substantially three-quarters of the housing, and when removed permits the rearward and downward withdrawal of the wheel from the frame without disturbing either the drive mechanism on the frame or detaching the members of the frame itself.

What I claim as my invention is:

1. A motorcycle, comprising driving and steering wheels, a rigid frame embracing said wheels and providing clearance for the turning of the latter, resilient vertically-yieldable supports for said frame upon said wheels, radius rods for connecting said wheels with said frame, and driving mechanism mounted on said frame operatively connected with said driving wheel in different positions of adjustment thereof.

2. In a motorcycle, the combination with the driving wheel, of a frame bifurcated to embrace said wheel and resiliently, yieldably supported thereon, a motor mounted on said frame, a transmission connection between said motor and drive wheel, a plurality of independent radius rods pivotally connecting said drive wheel with said frame, and a universal pivotal coupling in said transmission alined with the pivot axis of said radius rod.

3. In a motorcycle, the combination with a drive wheel, of a frame having side sills embracing said drive wheel, radius rods connecting said wheel to said frame, intermeshing bevel gears for driving said wheel, and a housing for said gears mounted upon one of said radius rods, and having a detachable section permitting the rearward removal of said wheel.

4. In a motorcycle, the combination with a drive wheel, of a frame having side sills embracing said drive wheel, a motor and transmission gearing mounted on said frame, radius rods upon opposite sides of the drive wheel pivotally connecting said drive wheel with said frame, intermeshing gears housed within one of said radius rods for driving said drive wheel, and a drive shaft extending through said last mentioned radius rod for connecting one of said gears with the transmission gearing, said drive shaft having a universal coupling therein in substantial transverse alinement with the pivotal points of the radius rods.

5. In a motorcycle, the combination with a drive wheel, of a frame having side sills embracing said drive wheel, a yoke, a spring connected to one of said sills, a tubular radius rod securing said drive wheel to said frame, intermeshing gears for driving said wheel, a housing for said gears upon said radius rod formed in sections, one of said sections forming a support for said yoke, and a bearing for attachment with said spring, the complementary section being detachable to permit the rearward and downward removal of said wheel from the frame.

In testimony whereof I affix my signature in presence of two witnesses.

JOHN J. CHAPIN.

Witnesses:
 FRANK R. DIETZ,
 WM. J. BELKNAP.